United States Patent
Shmuylovich et al.

(10) Patent No.: US 7,475,076 B1
(45) Date of Patent: Jan. 6, 2009

(54) METHOD AND APPARATUS FOR PROVIDING REMOTE ALERT REPORTING FOR MANAGED RESOURCES

(75) Inventors: Samuil Shmuylovich, Framingham, MA (US); Anoop George Ninan, Milford, MA (US); Keith Alan Carson, Jr., Hopkinton, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 271 days.

(21) Appl. No.: 11/233,643

(22) Filed: Sep. 23, 2005

(51) Int. Cl.
  *G06F 17/30* (2006.01)

(52) U.S. Cl. .................. 707/10; 709/210; 709/203; 714/6; 714/48

(58) Field of Classification Search ............ None
See application file for complete search history.

(56) References Cited

U.S. PATENT DOCUMENTS 7,194,538 B1 * 3/2007 Rabe et al. ............ 709/224

\* cited by examiner

*Primary Examiner*—John R. Cottingham
*Assistant Examiner*—Noosha Arjomandi
(74) *Attorney, Agent, or Firm*—Chapin IP Law, LLC; Barry W. Chapin, Esq.

(57) ABSTRACT

A system allows software not equipped to work with remote location alert reporting software to obtaining alert data indicating an alert associated with a first managed resource in a storage area network. The system identifies a top-level resource in the storage area network to which the first managed resource indicated by the alert data is related and performs remote alert notification analysis to determine if the top-level resource is a managed resource in the storage area network for which remote location alert reporting software is not operational. If the top-level resource is a managed resource for which remote location alert reporting software is not operational, the system proxy engages operation of remote location alert reporting software on behalf of the top-level resource to report the alert data via the communications interface to the remote location.

14 Claims, 4 Drawing Sheets

METHOD AND APPARATUS FOR PROVIDING REMOTE ALERT REPORTING FOR MANAGED RESOURCES

BACKGROUND

Modern data processing systems provide computer systems that manage and store large amounts of data. As an example, many commercial organizations such as Fortune-size companies, banks, mutual fund companies or the like often operate large and complex data processing systems that require access (storage and retrieval) to many hundreds of gigabytes or even terabytes of data. Computer system developers have responded to these types of data storage and information sharing requirements by creating networks specifically designed to efficiently store and allow access to such data. These networks are referred to as storage area networks or SANs. Elements of a typical conventional storage area network include one or more connectivity devices such as high speed data switches or routers that interconnect the various data storage systems to one or more host or server computer systems (servers) that require access (e.g., read and/or write access) to the data in the data storage systems on behalf of client software applications operating on client computer systems.

A developer or manager of a storage area network installs and operates one or more distributed storage area network management software applications within host computers in the network to manage or administer the various managed resources (i.e., devices, host computer systems, data storage systems, switches, database applications, etc.) that operate within the storage area network. A network manager (i.e., a person) responsible for management of the network operates the network management software application(s) to perform management tasks such as performance monitoring, network analysis, storage provisioning and remote configuration and administration of the various components (i.e., software and hardware resources) operating within the network.

A conventional network management software application may have several different software components that execute independently of each other on different computer systems but that collectively interoperate together to perform network management. As an example, conventional designs of storage area network management software applications can include management station programs such as console and server processes, several agent processes that operate on remote host computers, a store process to store data collected by agents and remote alert reporting software to provide alerts to vendor support centers in the event of failures.

A conventional remote alert reporting software application operates to provide alert data to remote computer systems that operate within a help desk or systems support center owned and operated by a vendor of storage area network devices. The support center may be a network operations center or facility located anywhere in the world that is staffed with knowledgeable support personnel at all times of the day or night. Such supports centers provide people and/or software that is capable of diagnosing a problem in the event of an alert in a customer's SAN. As an example, a vendor of large capacity data storage arrays may operate support servers in one or more support centers staffed with vendor experts that are accessible over a network such as the Internet. Storage area network devices sold by a particular vendor are capable of operating that vendor's remote alert reporting software to transport alert information to that vendor's support center in the event of a failure or other problem. In this manner, the remote alert reporting software for a particular device vendor provides around-the-clock reporting of problems related to that vendors SAN devices is they experience a problem such as a fault or failure.

SUMMARY

Conventional mechanisms and techniques that provide remote alert reporting suffer from a variety of deficiencies. In particular, conventional versions of remote alert reporting software are limited to reporting alert information concerning only specific vendor devices that experience alerts. Such conventional remote alert reporting software does not operate with many different vendors devices. This is because a particular vendor of SAN equipment typically only provides remote support services for devices manufactured by that vendor. However, it is often the case that a particular vendor of storage area network devices sells devices such as storage area network switches or data storage systems manufactured by a plurality of different vendors as a reseller. Accordingly, while some devices actually made by that vendor operating in storage area network are capable of interoperating with remote alert reporting software also made by that vendor, other devices from different vendors may have no knowledge or inherent capability to operate with that vendors remote alert reporting software. Accordingly, in a customer's storage area network, if devices from several different vendors operate together, situations can arise in which only certain ones of such devices are able to operate remote alert reporting software to notify a remote support center of a problem. If a device operating in a storage area network is not capable of operating in conjunction with the remote alert reporting software that is operational in a particular SAN, and that device experiences a problem that produces an alert to the storage area network management application, no remote support center will be notified of the problem.

Remote alert reporting software is typically installed and operates separately from SAN management software. As such, a conventional storage area network management application may detect an alert of a device from different vendors, but will be unable to transfer the alert condition and related alert data to a remote support center. Accordingly, a SAN that has devices from multiple vendors cannot be assured to provide around-the-clock remote alert reporting support for all vendor devices. This can be problematic for storage area network installations that must be available at all times and in which failures must be detected remotely, regardless of vendors of devices.

Embodiments of the invention significantly overcome this and other deficiencies associated with conventional storage area network management applications and conventional remote alert reporting software by providing mechanisms and techniques that allow a SAN management application to use an alert reporter to report alert data to a remote location, such as a network support center operated by a vendor of storage area network equipment, via proxy operation of remote alert reporting software. In the event of an alert condition within a device in a storage area network, some devices within the network that experience the alert are unable to invoke the functionality of remote alert reporting software. It may be the case, for example, that the device manufactured and sold by a first vendor is not equipped with the appropriate application programming interface to communicate with the remote alert reporting software manufactured by a second vendor. Remote alert reporting software often uses a proprietary set of interface calls known only to a single vendor.

Embodiments of the invention overcome this problem by providing an alert reporting application and process that works in conjunction with a storage area network management application. The storage area network management application is typically able to control and manage all of the devices operating within the storage area network, regardless of the vendor or manufacturer of such devices. This is because the storage area network management application often communicates with the various devices operating in the storage area network using a set of standardized application programming interfaces and protocols. Accordingly, the storage area network management application is often made aware of an alert indicating a problem associated with a particular device within a storage area network.

In a storage area network management application equipped with an alert reporter as disclosed herein, the alert reporter operates in conjunction with the storage area network management application (e.g., is integrated into the application in one configuration) and is able to obtain alert data indicating an alert associated with a first managed resource in a storage area network. The first manage resource may be any managed entity within the storage area network and can include devices or software processes such as individual ports within a host, switch or data storage system, individual file systems, volumes, devices or the like. The alert reporter operates to identify a top-level resource in the storage area network to which the first managed resource indicated by the alert data is related. A top-level resource in the storage area network is generally defined as either one or more host computer systems, one or more storage area network connectivity devices such as a switch or router, one or more data storage systems, one or more switch fabrics or the like. As an example, if the first managed resource to which the alert data relates is a file system, the alert reporter is able to determine an identity of a host computer system in which the file system exists. If the first managed resource to which the alert data relates is a switch port, the alert reporter is able to identify the switch that contains the port that experienced the alert.

Generally then, when the storage area network management application receives an alert associated with a particular resource in the storage area network, the alert reporter is able to determine to which top-level managed resource the alert relates. Thereafter, the alert reporter operates to perform remote alert notification analysis to determine if the top-level resource is a managed resource in the storage area network for which remote location alert reporting software is or is not operational. In other words, the alert reporter is able to determine whether or not a particular top-level resource such as a switch or data storage or host device operating in storage area network is equipped to operate with remote alert reporting software that is able to handle transmission of the alert information to a remote support center on behalf of the top-level device (within which the device that experience the alert operates).

As an example, if the first managed resource is a host bus adapter card operating within a host device in the storage area network, the alert data obtained by the alert reporter and by the storage area network management application may indicate a failure of this host bus adapter. The alert reporter is able to identify the specific top-level resource, which is the specific host in this example that operates the failed host bus adapter card, and is further able to determine whether or not this host computer system is equipped to operate with and invoke the functionality of remote alert reporting software in order to indicate the failure of the host bus adapter card within this host to a remote support center.

If the alert reporter determines that the top-level resource is a managed resource for which remote location alert reporting software is not operational, the alert reporter is able to "proxy" engage operation of remote location alert reporting software on behalf of the top-level resource to report the alert data to the remote location. The alert reporter is able to package the alert data and activate the alert reporting software on behalf of the failed resource (the top-level resource to which the alert is related). In this manner, a storage area network management application equipped with the alert reporter as explained herein is able to perform remote alert reporting on behalf of devices operating within the storage area now network that are unable to do so themselves. In a storage area network including devices from several different vendors and manufacturers, embodiments of the invention provide remote alert reporting capabilities for all of such devices, even though many of such devices are not themselves equipped with remote alert reporting capabilities. Further details of operations of embodiment of the invention will be explained more fully herein.

Other embodiments of the invention include computerized devices, such as host and management server computer systems, workstations or other computerized devices configured to process all of the method operations disclosed herein as embodiments of the invention for both the agent and store processes. In such embodiments, a computerized device includes a memory system, a processor, a communications interface and an interconnection mechanism connecting these components. The memory system is encoded with either an agent application (if the host computer) or a server application (if the storage computer system) that when performed on the processor, produces an alert reporting process that operates as explained herein.

Other arrangements of embodiments of the invention that are disclosed herein include software programs to perform the method embodiment steps and operations summarized above and disclosed in detail below for both the storage area network management application and alert reporting process. More particularly, a computer program product is disclosed that has a computer-readable medium including computer program logic encoded thereon that when performed in a computerized device provides associated operations of the alert reporter as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes such as the alert reporter and storage area network management application processes could execute on a set of dedicated or shared computers, or on one computer alone.

It is to be understood that the system of the invention can be embodied strictly as a software program, as software and hardware, or as hardware alone. Example embodiments of the invention may be implemented within EMC's Control Center software application that provides management functionality for storage area network resources and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
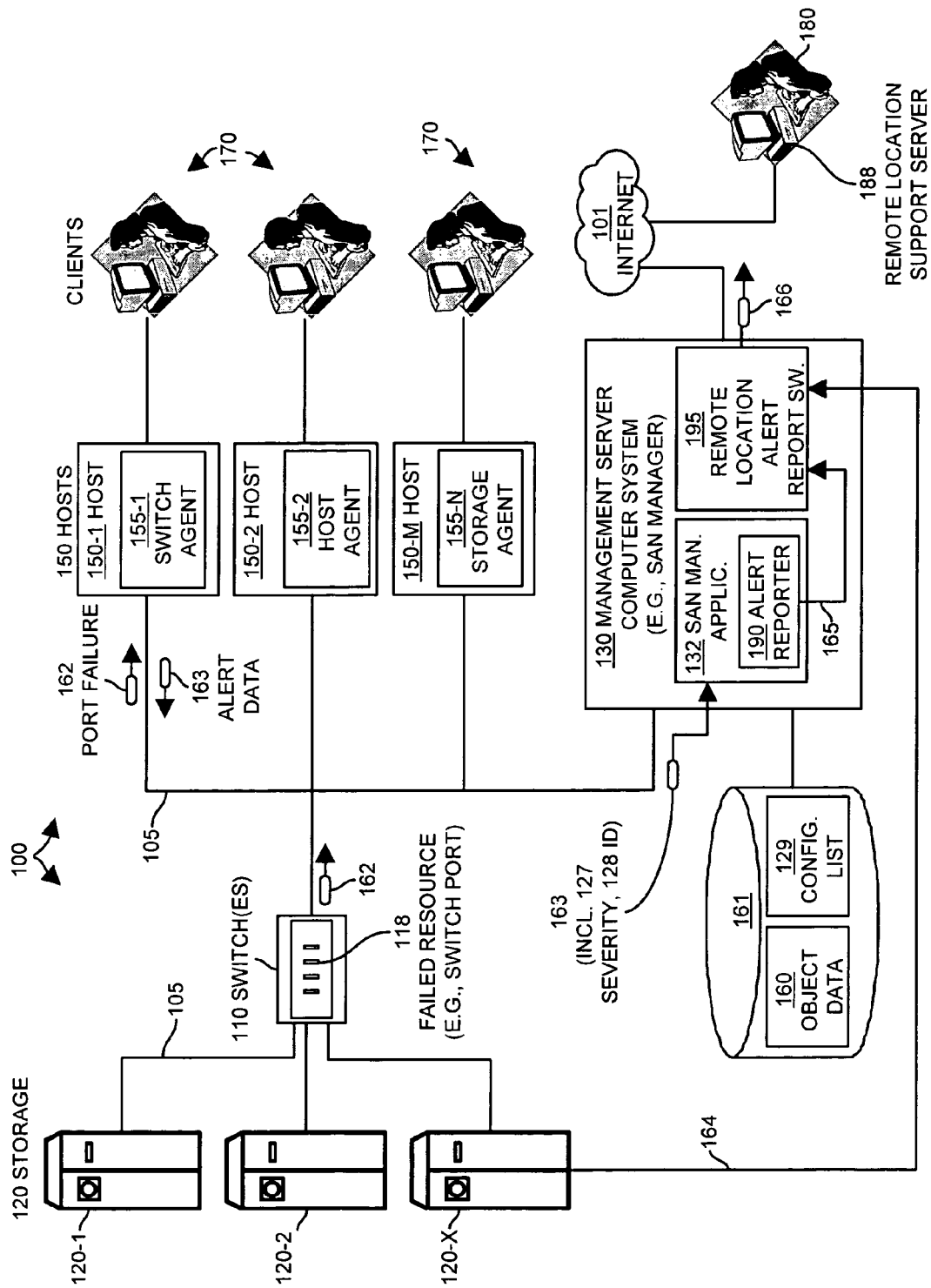
FIG. 1 illustrates an example storage area network and computing system environment including an alert reporter configured to operate according to embodiments of the invention.

FIG. 1 illustrates an example configuration of a storage area network 100 suitable for use in explaining example of embodiment of the invention. The storage area network 100 includes a network medium 105 such as data communications links that interconnect one or more storage area network switches 110 to data storage systems 120-1 through 120-X and host computer systems 150-1 through 150-M. Each host computer systems 150 may be, for example, a server computer system that operates server software (not shown) to access data within the storage area network 120 on behalf of client computer systems 170 that request access to such data.

The storage area network 100 includes a management server computer system 130 that operates storage area network management application software 132 that includes an alert reporter 190 configured as disclosed herein. The management server computer system 130 operates remote location alert reporting software 195 also as explained herein. The management server computer system 130 in this example is connected to a wide area network 101 such as the Internet and supports communication to one or more remote location support servers 188.

The remote location support servers 188 represent full-time network operation support centers provided by vendors of the various top-level managed resources such as data storage systems 120, switch devices 110 and host devices 150 operating within the storage area network 100. Support personnel 180 monitor the remote location support servers 188 on a full-time day and night and year-round basis in order to be able to respond to faults, alerts or failures associated with equipment installed within customer storage area networks. There may be many remote location support servers 180 at different geographic locations around the world operating and behalf of different vendors of storage area network equipment. The remote location alert reporting software 195 is able to receive alert notifications 164 and 165 and is able to report such alert notifications in alert information 166 over the Internet 101 to the remote location support servers 188.

The management application 132 maintains a managed object database 161 that includes managed object data 160. The managed object data 160 represents various managed resources such as storage devices 120, switches 110 and host computer systems 150 that operate within the storage area network 100. The managed object data 160 includes data to represent lower-level managed resources such as individual components (e.g., hardware devices or software processes) operating or configured within the various top-level managed resources within the storage area network 100. In one configuration, the managed object data 160 is a hierarchical representation of the various managed resources in a storage area network 100. As an example, a top-level managed resource such as a data storage system 120 may be configured with a plurality of storage devices that are considered to be lower-level devices in the storage area network management hierarchy below the top-level data storage system 120. As another example, a connectivity device such as the switch 110 is a top-level managed resource and includes, for example, a plurality of switch ports 118 which are each considered lower-level manage resources in relation to the top-level managed switch resource 110 in which those ports operate. As a final example, a top-level managed resource such as a host computer system 150 may include various lower-level managed resources such as host bus adapter cards, volumes, file systems, operating systems and third party software applications such as database instances which each may be considered lower-level managed resources in relation to the top-level host managed resource in the managed object data 160.

In accordance with one embodiment of the invention, the remote location alert reporting software 195 only operates with certain top-level managed resources in the storage area network 100. As an example, perhaps only the data storage system 120-X is operable to provide an alert notifications 164 directly to the remote location alert reporting software 195 which can then forward such notifications 164 as alert data 166 to the proper remote location support servers 188. Other data storage systems 120-1 and 122 might not be equipped with such functionality for a variety of reasons. Perhaps the data storage systems 120-1 and 120-2 are manufactured by a vendor that does not provide a proper application programming interface or software support to communicate with remote location alert reporting software 195, which may be made by a different vendor (e.g., a vendor of storage system 120-X).

Embodiments of the invention generally operate the alert reporter 190 within the storage area network management application 132 to determine whether or not a particular top-level managed resource that has a related alert is or is not capable of communicating directly with remote location alert reporting software 195. If the alert reporter 190 determines that a top-level managed resource, such as a data storage system 120, storage area network switch 110 or host 150 is not equipped for whatever reason to communicate directly with remote location alert reporting software 195, the alert reporter 190 is able to proxy engage operation of the alert software 195 by formatting alert data 163 provided by the storage area network management application 132 into a properly formatted alert notifications 165. These are then transmitted to the remote location alert reporting software 195 so that the alert notifications 165 are properly forwarded to an appropriate remote location support servers 188. This process is referred to herein as proxy engaging the remote location alert reporting software 195.

Figure 2:
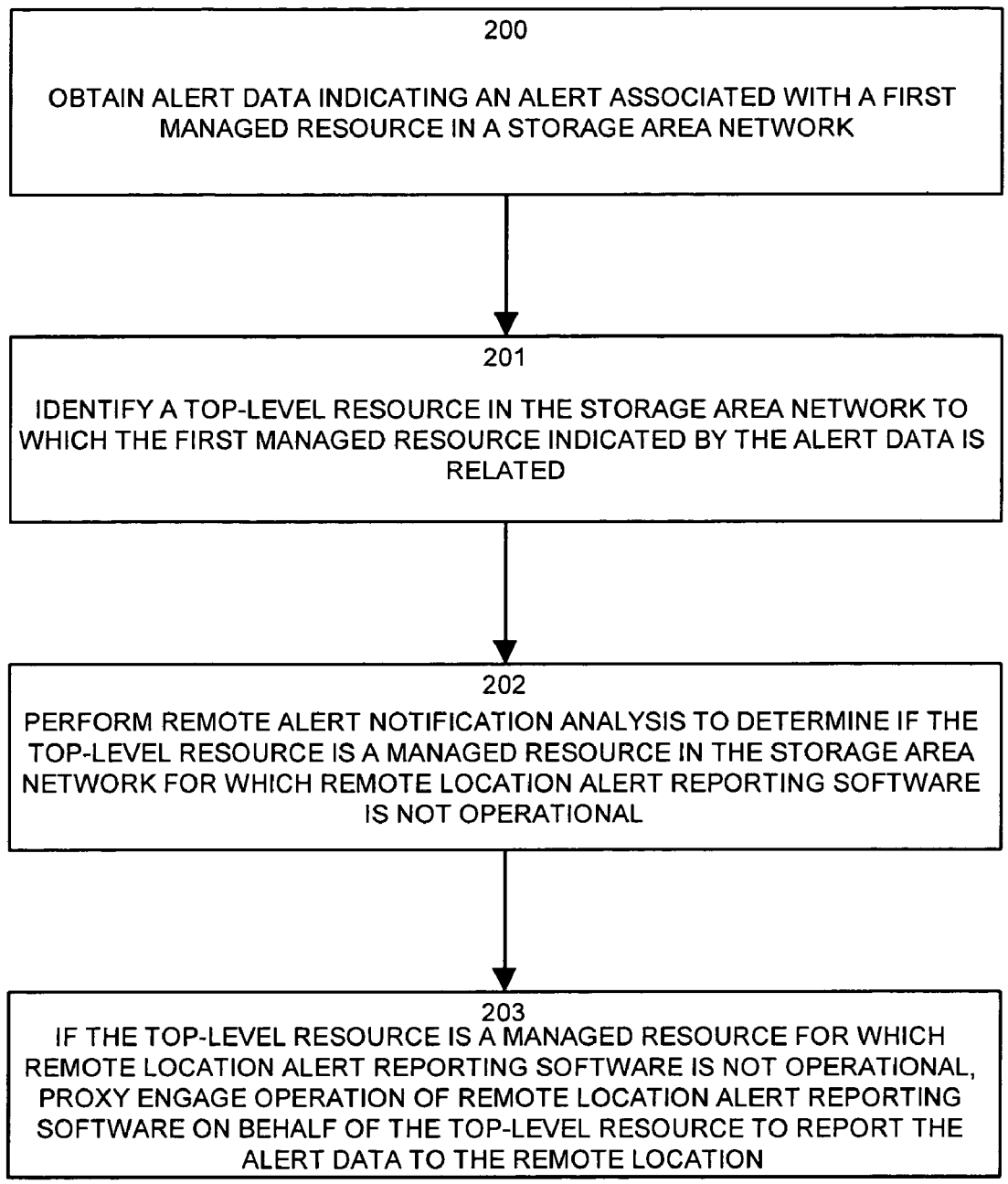
FIG. 2 is a flow chart of processing steps that show the general operation of an alert reporter configured to process alert data according to one example embodiment of the invention.

Further details of these operations will now be provided with respect to the flowchart of high-level processing steps in FIG. 2. During the discussion of processing and the flowcharts that follow, reference will be made to the examples storage area network 100 illustrated in FIG. 1.

FIG. 2 is a flow chart of processing steps that the alert reporter 190 performs to reporting alert data to a remote location, such as a support server.

In step 200, the alert reporter 190 (operating in conjunction with the storage area network management application 132, such as a server plug-in) obtains alert data 163 that identifies an alert, fault, failure, problem or other error associated with a first managed resource in a storage area network 100. The first managed resource can be any resource that experiences an alert within the managed object data hierarchy as explained above. In the example illustrated in FIG. 1, the switch port 118 represents a failed resource within a switch 110 (which represents a top-level managed resource in this example). Accordingly, the alert data 163 identifies the failed switch port resource 118 as the first managed resource. The actual failure may be detected by the switch agent 155-1 operating on the host computer system 150-1 by a port failure message 162 transmitted from the switch 110 to the switch agent 155-1. Alternatively, the switch agent 155-1 may proactively detect the failed switch port 118 by a query to the switch 110. In any event, upon detection of the port failure 162, the switch agent 155-1 generates alert data 163 that is transferred over the storage area network to the management application 132. In yet another alternative configuration, managed resources operating within the storage area network may report alert data 163 directly to the storage area network management application 132.

In step 201, the alert reporter 190 operates to identify a top-level resource in the storage area network 100 which is related to the first managed resource identified in the alert data 163. The remote location alert reporting software 195 only operates with certain top-level managed resources in the storage area network 100. The alert reporter 190 is able to use information contained within the alert data 163 and the managed object data 160 to identify which particular top-level managed resource within the storage area network 100 is responsible for operation of the particular first managed resource that experience the failure, error or alert. In the example shown in FIG. 1, the alert reporter 190 is able to use information within the alert data 163 in conjunction with the managed object data 160 to traverse the hierarchy of managed resources to identify that the failed switch port 118 is contained within the top-level managed switch resource 110 within the storage area network 100.

In step 202, the alert reporter 190 performs remote alert notification analysis to determine if the top-level resource (i.e., the switch 110 in the example FIG. 1) is a managed resource in the storage area network 100 for which remote location alert reporting software 195 is or is not operational. That is, the alert reporter 190 is able to determine whether or not the top-level managed resource to which the alert data 163 is related (i.e., hierarchically within the managed object data 160) is able to operate directly with the remote location alert reporting software 195. In the example illustrated FIG. 1 (as noted above), the data storage system 120-X is equipped with logic or other functionality to allow direct interaction and invocation of the remote location alert reporting software 195. However, the switch device 110 is a top-level managed resource that is not capable, on its own, of directly interacting with or invoking operation of remote location alert reporting software 195.

In step 203, if the top-level resource (i.e., the switch 110 in this example) is a managed resource for which remote location alert reporting software is not operational (which it is not in this example), the alert reporter 190 proxy engages 165 operation of remote location alert reporting software 195 on behalf of the top-level resource to report the alert data 163 (or a variant thereof) to the remote location 188. In this manner, embodiments of the invention provide an alert reporter 190 that works in conjunction with the storage area network management application 132 to allow any device within the storage area network 100 to benefit from the operation of remote location alert reporting software 195, even if those devices themselves are not able to invoke operation of such software. Accordingly, if the storage area network management application 132 can identify alert data 163 for a variety of different devices from many different vendors operating within the storage area network 100, and many of those devices are not equipped themselves to utilize the functionality of remote location alert reporting software 195, the alert reporter 190 can nonetheless provide the benefits of the alert reporting software 195 on behalf of those devices.

Figure 3:
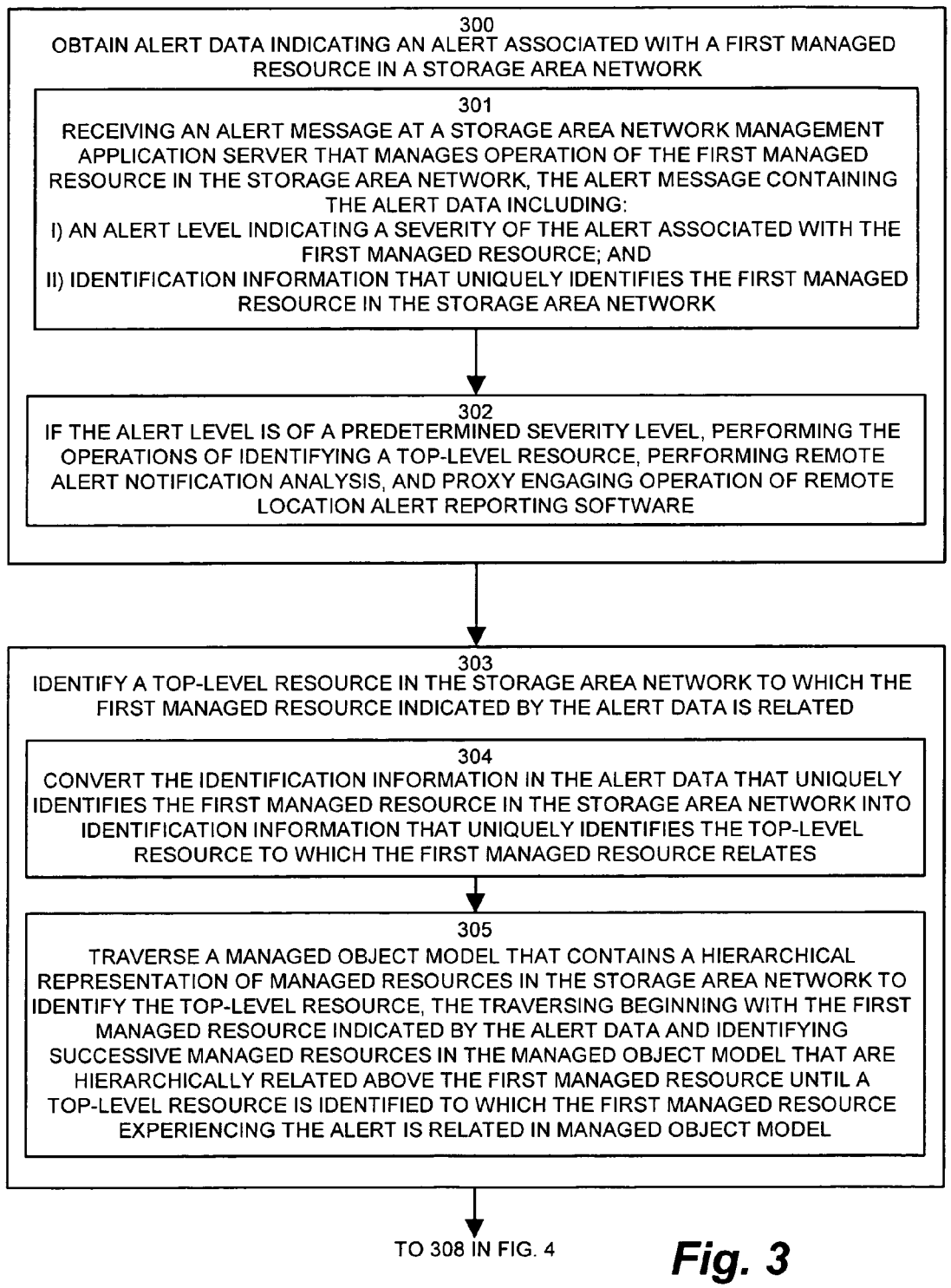
FIGS. 3 and 4 are a flow chart of processing steps that a alert reporter performs to proxy engage remote location alert reporting software according to one example embodiment of the invention.
Figure 4:
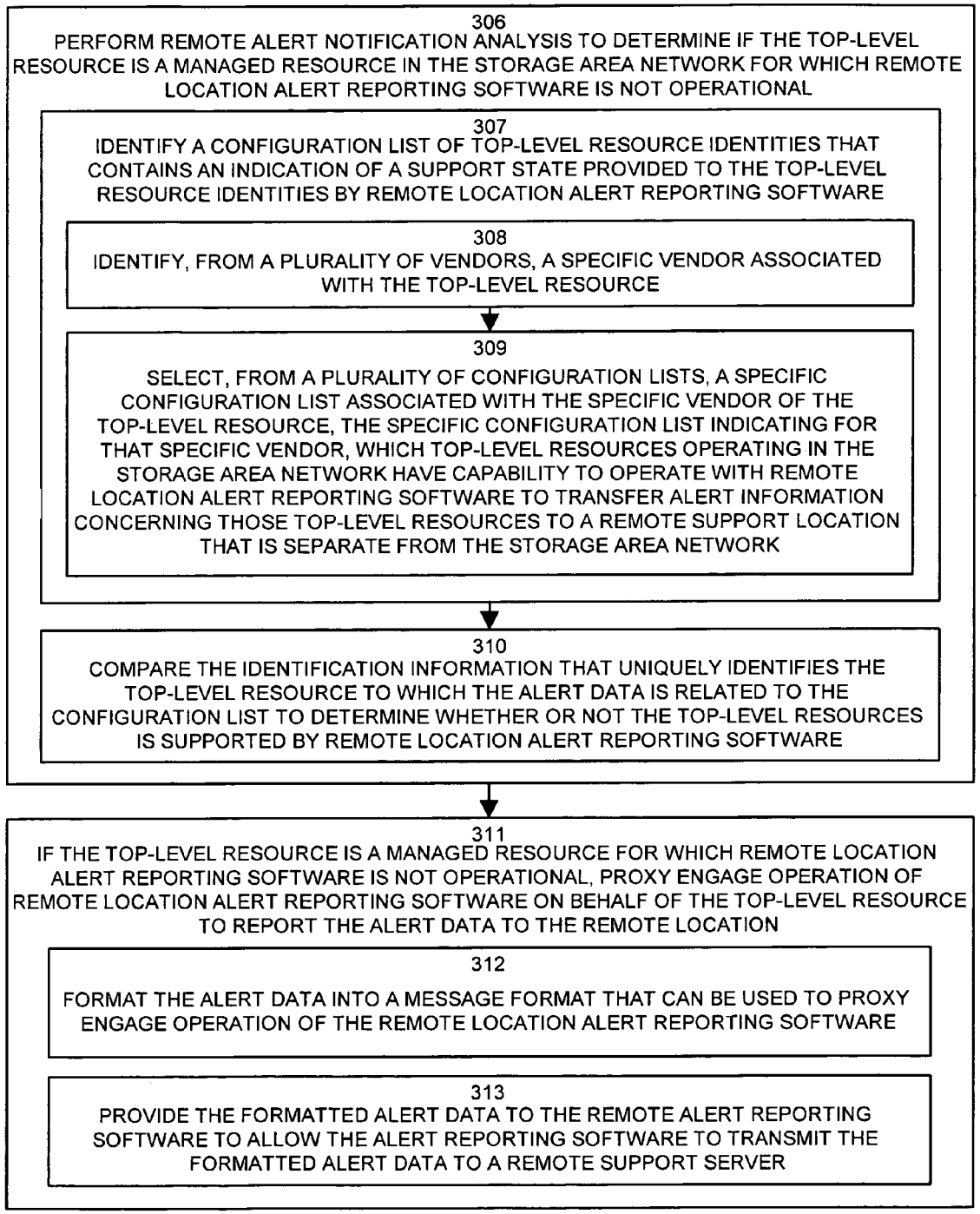

FIGS. 3 and 4 are a single flowchart illustrating more detailed operation of the alert reporter 190 as configured in accordance with example embodiment of the invention.

In step 300, the alert reporter 190 (via the SAN management application 132) obtains alert data 163 indicating an alert associated with a first managed resource (e.g., failed port 118) in a storage area network. Steps 301 and 302 show details of this processing in accordance with one example embodiment of the invention.

In step 301, the storage area network management application 140 (including the alert reporter 190) that manages operation of the first managed resource 118 in the storage area network 100 receives an alert message containing alert data 163. The alert data 163 includes i) an alert level 127 indicating a severity of the alert associated with the first managed resource 118, and ii) identification information 128 that uniquely identifies the first managed resource (the switch port 118 in this example) in the storage area network. The severity level 127 can be included as a separate metric in the alert data 163, or the SAN managed application 132 can infer the severity based on the type of alert (e.g. port failure indicating a severe alert).

In step 302, the alert reporter 190 determines if the alert level is of a predetermined severity level, and if so, performs the remaining operations of identifying a top-level resource, performing remote alert notification analysis, and proxy engaging operation of remote location alert reporting software as explained herein.

In step 303, the alert reporter 190 identifies a top-level resource (e.g., switch 110) in the storage area network to which the first managed resource (e.g. port 118) indicated by the alert data is related. Steps 304 and 305 show details of this processing in one example embodiment.

In step 304, the alert reporter 190 converts the identification information 128 in the alert data 163 that uniquely identifies the first managed resource (e.g. port 118) in the storage area network into identification information that uniquely identifies the top-level resource (e.g. switch 110) to which the first managed resource relates. Step 305 shows details of this processing in accordance with one example configuration.

In step 305, the alert reporter 190 uses an alert propagation system of the storage area network management application 132 and traverses a managed object model of the managed object data 160 that contains a hierarchical representation of managed resources in the storage area network to identify the appropriate top-level resource. In particular, the traversal begins with the first managed resource 118 indicated (128) by the alert data 163 and identifies successive managed resources in the managed object model 160 that are hierarchically related above the first managed resource 118 until a top-level resource (e.g. switch 110) is identified to which the first managed resource experiencing the alert is related in the managed object model 160. In this manner, the alert reporter 190 can detect any alert data 163 and if the alert is of a severity sufficient enough to warrant reporting to the remote location 188, the alert reporter 190 can identify the top-level resource to which the alert relates.

In an storage area network, the alert reporter 190 can identify top-level managed objects such as a host computer system installed in the storage area network, a storage area network switch installed in the storage area network to couple a host to a data storage system, a data storage system installed in the storage area network, a storage area network fabric coupling at least one host and at least one data storage system installed in the storage area network, or a software application installed within a computerized device in the storage area network. These represent examples of top-level managed resources that may or may not support remote alert reporting capability. Depending upon the SAN architecture, other types of top-level resources may exist as well such as backup systems.

FIG. 4 is a flow chart of processing steps that continue the processing from the flow chart in FIG. 3.

In step 306, the alert reporter 190 performs remote alert notification analysis to determine if the top-level resource is a managed resource in the storage area network for which remote location alert reporting software is not operational. Steps 307 through 310 show details of this processing.

In step 307, the alert reporter 190 identifies a configuration list 129 of top-level resource identities that contains an indication of a support state provided to the top-level resource identities by remote location alert reporting software. Depending upon the embodiment, in one example, the configuration list 129 of top-level resource identities indicates a list of top-level resources that are not supported by remote location alert reporting software. In another embodiment, the configuration list 129 of top-level resource identities indicates a list of top-level resources that were provided by a specific vendor to a customer operating the storage area network and that do not support operation of remote location alert reporting software for those top-level resources. As an example, the configuration list 129 for multiple vendor devices can appear as follows:

| EXAMPLE CONFIGURATION LIST 129 | |
| --- | --- |
| TOP-LEVEL DEVICE | REMOTE SUPPORT? |
| HOST 150-1 | NO |
| HOST 150-2 | NO |
| SWITCH 110 | NO |
| . . . | . . . |

In one configuration, the configuration list 129 exists on a per vendor basis. In step 308, the alert reporter 190 identifies, from a plurality of vendors, a specific vendor associated with the top-level resource (e.g., vendor of switch 110).

In step 309, the alert reporter 190 selects, from a plurality of configuration lists (e.g. 129-1 . . . 129-M), a specific configuration list 129 associated with the specific vendor of the top-level resource. The specific configuration list 129 indicates for that specific vendor, which top-level resources operating in the storage area network 100 have (or do not have) capability to operate with remote location alert reporting software 195 to transfer alert information (e.g., 166) concerning those top-level resources to a remote support location 188 that is separate from the storage area network 100.

In step 310, the alert reporter 190 compares the identification information that uniquely identifies the top-level resource 110 to which the alert data is related to the configuration list 129 to determine whether or not the top-level resources is supported by remote location alert reporting software 195.

If the top-level device is not supported, in step 311, the alert reporter 190 proxy engages operation of remote location alert reporting software 195 to report the alert data 163 to the remote location. Steps 312 and 313 show this processing in one example configuration.

In step 312, the alert reporter 190 formats the alert data 163 into a message format 165 that can be used to proxy engage (via call 165) operation of the remote location alert reporting software 195.

In step 313, the alert reporter 190 provides (via call 165) the formatted alert data to the remote alert reporting software 195 to allow the alert reporting software 195 to transmit 166 the formatted alert data to a remote support server 188. The call 165 can be any type of inter-application communications, such as writing the formatted alert data 163 in a proper format to a file which the remote location alert reporting software 195 can detect and then use to contact the remote server 188. Alternatively, the alert reporter 190 can make a direct API call to the remote location alert reporting software 195 using any type of remote procedure call or interprocess communication mechanism. In this manner, the alert data 163 received by the SAN management application 132 is sent via proxy to the remote location alert reporting software 195 via the alert reporter 190 (hence the term proxy engaging the remote alert reporting software).

Other alternative arrangements of the invention include rearranging the processing steps explained above in the flow charts in such a way that the overall effect of the invention is the same. It is to be thus understood by those skilled in the art that the particular arrangement of processing steps in many instances does not specify the exact implementation of embodiments of the invention. As such, those skilled in the art of software development and computer-related technologies will understand that there can be many ways and orders of representing the processing operations explained above and such alternative software code will still achieve the overall operation as explained herein. In addition, embodiments of the invention are not limited to operation on the computer systems shown above. The alert reporter 190, SAN management application 132 and remote location alert reporting software 195 can operate in the same computer system, or in different computer systems that may be shared computing resources, or can be distributed among any number of computer systems. Furthermore, embodiments of the invention are not limited to operation in a storage area network management application, but are intended to be generally applicable to any type of network management application. Accordingly, embodiments of the invention are not limited to the processing arrangements explained above.

What is claimed is:

1. A method for reporting alert data to a remote location, the method comprising: obtaining alert data indicating an alert associated with a first managed resource in a storage area network, comprising receiving an alert message at a storage area network management application server that manages operation of the first managed resource in the storage area network, the alert message containing the alert data including:
  i) an alert level indicating a severity of the alert associated with the first managed resource;
  ii) identification information that uniquely identifies the first managed resource in the storage area network;
  if the alert level is of a predetermined severity level:
    identifying a top-level resource in the storage area network to which the first managed resource indicated by the alert data is related;
    performing remote alert notification analysis to determine that the top-level resource is a managed resource in the storage area network for which remote location alert reporting software is not operational; and
    proxy engaging operation of remote location alert reporting software on behalf of the top-level resource to report the alert data to the remote location, wherein identifying the top-level resource in the storage area network to which the first managed resource indicated by the alert data is related converts the identification information in the alert data that uniquely identifies the first managed resource in the storage area network into identification information that uniquely identifies the top-level resource to which the first managed resource relates,
  wherein converting the identification information in the alert data traverses a managed object model that contains a hierarchical representation of managed resources in the storage area network to identify the top-level resource in an alert propagation system of the storage area network management application, wherein the traversing beginning with the first managed resource indicated by the alert data and identifying successive managed resources in the managed object model that are hierarchically related above the first managed resource until a top-level resource is identified to which the first managed resource experiencing the alert is related in managed object model.

2. The method of claim 1 wherein converting the identification information in the alert data comprises: identifying the top-level managed object to which the first managed resource experiencing the alert is related as at least one of: a host computer system installed in the storage area network; a storage area network switch installed in the storage area network to couple a host to a data storage system; a data storage system installed in the storage area network; a storage area network fabric coupling at lest one host and at least one data storage system installed in the storage area network; and a software application installed within a computerized device in the storage area network.

3. The method of claim 1 wherein performing remote alert notification analysis to determine if the top-level resource is a managed resource in the storage area network for which remote location alert reporting software is not operational comprises: identifying a configuration list of top-level resource identities that contains an indication of a support state provided to the top-level resource identities by remote location alert reporting software; and comparing the identification information that uniquely identifies the top-level resource to which the alert data is related to the configuration list to determine whether or not the top-level resources is supported by remote location alert reporting software.

4. The method of claim 3 wherein the configuration list of top-level resource identities indicates a list of top-level resources that are not supported by remote location alert reporting software.

5. The method of claim 3 wherein the configuration list of top-level resource identities indicates a list of top-level resources that were provided by a specific vendor to a customer operating the storage area network and that do not support operation of remote location alert reporting software for those top-level resources.

6. The method of claim 5 wherein identifying a configuration list of top-level resource identities that contains an indication of a support state provided to the top-level resource comprises:
  identifying, from a plurality of vendors, a specific vendor associated with the top-level resource;
  selecting, from a plurality of configuration lists, a specific configuration list associated with the specific vendor of the top-level resource, the specific configuration list indicating for that specific vendor, which top-level resources operating in the storage area network have capability to operate with remote location alert reporting software to transfer alert information concerning those top-level resources to a remote support location that is separate from the storage area network.

7. The method of claim 1 wherein proxy engaging operation of remote location alert reporting software to report the alert data to the remote location comprises:
  formatting the alert data into a message format that can be used to proxy engage operation of the remote location alert reporting software; and
  providing the formatted alert data to the remote alert reporting software to allow the alert reporting software to transmit the formatted alert data to a remote support server.

8. A computer system comprising:
  a memory;
  a processor;
  a communications interface;
  an interconnection mechanism coupling the memory, the processor and the communications interface;
  wherein the memory is encoded with an alert reporter application that is performed on the processor, provides an alert reporter that reports alert data to a remote location by performing operations of:
  obtaining alert data via the communications interface, the alert data indicating an alert associated with a first managed resource in a storage area network, comprising receiving an alert message at a storage area network management application server that manages operation of the first managed resource in the storage area network, the alert message containing the alert data including:
    i) an alert level indicating a severity of the alert associated with the first managed resource;
    ii) identification information that uniquely identifies the first managed resource in the storage area network;
    if the alert level is of a predetermined severity level:
      identifying a top-level resource in the storage area network to which the first managed resource indicated by the alert data is related;
      performing remote alert notification analysis to determine that the top-level resource is a managed resource in the storage area network for which remote location alert reporting software is not operational; and
      proxy engaging operation of remote location alert reporting software on behalf of the top-level resource to report the alert data to the remote location, wherein identifying the top-level resource in the storage area network to which the first managed resource indicated by the alert data is related converts the identification information in the alert data that uniquely identifies the first managed resource in the storage area network into identification information that uniquely identifies the top-level resource to which the first managed resource relates,
wherein converting the identification information in the alert data traverses a managed object model that contains a hierarchical representation of managed resources in the storage area network to identify the top-level resource in an alert propagation system of the storage area network management application, wherein the traversing beginning with the first managed resource indicated by the alert data and identifying successive managed resources in the managed object model that are hierarchically related above the first managed resource until a top-level resource is identified to which the first managed resource experiencing the alert is related in managed object model.

9. The computer system of claim 8 wherein converting the identification information in the alert data comprises: identifying the top-level managed object to which the first managed resource experiencing the alert is related as at least one of: a host computer system installed in the storage area network; a storage area network switch installed in the storage area network to couple a host to a data storage system; a data storage system installed in the storage area network; a storage area network fabric coupling at lest one host and at least one data storage system installed in the storage area network; and a software application installed within a computerized device in the storage area network.

10. The computer system of claim 8 wherein performing remote alert notification analysis to determine if the top-level resource is a managed resource in the storage area network for which remote location alert reporting software is not operational comprises: identifying a configuration list of top-level resource identities that contains an indication of a support state provided to the top-level resource identities by remote location alert reporting software; and comparing the identification information that uniquely identifies the top-level resource to which the alert data is related to the configuration list to determine whether or not the top-level resources is supported by remote location alert reporting software.

11. The computer system of claim 10 wherein the configuration list of top-level resource identities indicates a list of top-level resources that were provided by a specific vendor to a customer operating the storage area network and that do not support operation of remote location alert reporting software for those top-level resources.

12. The computer system of claim 11 wherein identifying a configuration list of top-level resource identities that contains an indication of a support state provided to the top-level resource comprises:
identifying, from a plurality of vendors, a specific vendor associated with the top-level resource;
selecting, from a plurality of configuration lists, a specific configuration list associated with the specific vendor of the top-level resource, the specific configuration list indicating for that specific vendor, which top-level resources operating in the storage area network have capability to operate with remote location alert reporting software to transfer alert information concerning those top-level resources to a remote support location that is separate from the storage area network.

13. The computer system of claim 8 wherein proxy engaging operation of remote location alert reporting software to report the alert data to the remote location comprises:
formatting the alert data into a message format that can be used to proxy engage operation of the remote location alert reporting software; and
providing the formatted alert data to the remote alert reporting software to allow the alert reporting software to transmit the formatted alert data to a remote support server.

14. A computer readable storage medium comprising executable instructions encoded thereon operable on a computerized device to perform processing that provides an alert reporter that performs the operations of:
obtaining alert data indicating an alert associated with a first managed resource in a storage area network, comprising receiving an alert message at a storage area network management application server that manages operation of the first managed resource in the storage area network, the alert message containing the alert data including:
i) an alert level indicating a severity of the alert associated with the first managed resource;
ii) identification information that uniquely identifies the first managed resource in the storage area network;
if the alert level is of a predetermined severity level:
identifying a top-level resource in the storage area network to which the first managed resource indicated by the alert data is related;
performing remote alert notification analysis to determine that the top-level resource is a managed resource in the storage area network for which remote location alert reporting software is not operational; and
proxy engaging operation of remote location alert reporting software on behalf of the top-level resource to report the alert data to the remote location, wherein identifying the top-level resource in the storage area network to which the first managed resource indicated by the alert data is related converts the identification information in the alert data that uniquely identifies the first managed resource in the storage area network into identification information that uniquely identifies the top-level resource to which the first managed resource relates,
wherein converting the identification information in the alert data traverses a managed object model that contains a hierarchical representation of managed resources in the storage area network to identify the top-level resource in an alert propagation system of the storage area network management application, wherein the traversing beginning with the first managed resource indicated by the alert data and identifying successive managed resources in the managed object model that are hierarchically related above the first managed resource until a top-level resource is identified to which the first managed resource experiencing the alert is related in managed object model.

* * * * *